United States Patent
Strand

[19]

[11] Patent Number: 6,031,522
[45] Date of Patent: Feb. 29, 2000

[54] ERGONOMIC COMPUTER MOUSE BASED ON HAND SIZE AND PREFERENCE

[75] Inventor: Todd Strand, Kasson, Minn.

[73] Assignee: International Business Machines Corporation, Armonk, N.Y.

[21] Appl. No.: 08/905,835

[22] Filed: Aug. 4, 1997

[51] Int. Cl.[7] .................................................. G09G 5/08
[52] U.S. Cl. ......................... 345/163; 345/164; 345/167; 248/918
[58] Field of Search ................................... 345/163, 164, 345/167, 156, 157; 248/918

[56] References Cited

U.S. PATENT DOCUMENTS

| | | | |
|---|---|---|---|
| 4,340,067 | 7/1982 | Martin et al. | 248/118.5 |
| 4,786,892 | 11/1988 | Kubo et al. | 345/164 |
| 4,831,736 | 5/1989 | Bryant, Sr. | 33/1 M |
| 4,906,843 | 3/1990 | Jones et al. | 250/221 |
| 5,245,146 | 9/1993 | Florence | 200/333 |
| 5,488,392 | 1/1996 | Harris | 345/157 |
| 5,570,112 | 10/1996 | Robinson | 345/163 |
| 5,851,623 | 12/1998 | Tarulli et al. | 428/68 |

Primary Examiner—Dennis-Doon Chow
Assistant Examiner—Amr Awad
Attorney, Agent, or Firm—Andrew J. Dillon

[57] ABSTRACT

A hand-held mouse has a base pointing unit with a movement sensor and a plurality of switches for selecting a visual object indicated by a location of the graphical pointer on the display, and an outer shell surrounding and removably attached to the base pointing unit. A user has to purchase only one base computer mouse in order to accommodate other users. The shells are easily switched since the users do not have to unplug the base computer mouse to switch to a different computer mouse, and they are relatively inexpensive compared to purchasing completely separate computer mice. Different shells can be used with a common base computer mouse for different computer systems, and the outer shell might accordingly have a fewer number of buttons than there are switches on the base pointing unit.

13 Claims, 3 Drawing Sheets

ERGONOMIC COMPUTER MOUSE BASED ON HAND SIZE AND PREFERENCE

BACKGROUND OF THE INVENTION

1. Field of the Invention

The present invention generally relates to computer systems and, more particularly, to a pointer device, commonly referred to as a mouse, which is used to control a visual pointer on a display of a computer system.

2. Description of the Related Art

A computer system includes many components, such as the central processing unit (or processor); temporary memory for storing program instructions (like random access memory, or RAM); a permanent storage device (such as a hard disk); and a variety of user interface devices, such as a video display, a keyboard, and a pointing device which controls the movement of a graphical pointer on the display. The graphical pointer is used to select certain areas on the screen, such as words in a text-only display or icons in a more complicated graphical user interface (GUI). An area is selected by placing the graphical pointer over the area (i.e., moving the physical pointing device) and then clicking one or more buttons on the pointing device. Other operations can be performed using the graphical pointer besides simple selection, such as "drag and drop" operations.

The pointing device, often referred to as a "mouse," can come in a variety of physical embodiments. The most familiar design is a hand-held controller having a ball therein which extends partially through a hole in the bottom of the unit, so that the unit can be pushed along a flat surface to cause the ball to roll. Transducers within the unit (such as optical transducers) convert the motion of the ball to electrical signals which are transmitted to the processor or to a controller circuit connected to the processor, which, in turn, decodes those signals to determine how the graphical pointer on the display should be manipulated. Other physical embodiments of pointer devices include electrically sensitive pads, joysticks, and joystick-type actuators, a track ball, etc.

A typical mouse is shown in FIG. 1. Mouse 10 is generally comprised of a body 12 having one or more buttons 14, 16, and a roller ball (not visible in FIG. 1) which partially extends through a hole in the underside of body 12. When body 12 is pushed along a relatively flat surface, the roller ball's movements are sensed and appropriate signals are generated and sent to the computer system via wire 18 (transmission can also be wireless, e.g., radio wave or infrared). The signals are typically sensed by an input/output (I/O) controller which is connected to the computer's central processing unit (CPU); the CPU interprets the signals and sends appropriate data to a display adapter which then causes "movement" of the graphical pointer on the display. Mouse movement, measured in units called "mickies," is a constant of the mouse itself. A certain mouse movement distance always results in the same number of mickies being reported to the host system. Software commonly allows the user to adjust the sensitivity (i.e., speed) of the graphical pointer, such that it may be slowed down to allow finer movements or sped up to move the pointer more quickly across the display screen, by programming different pointer movement rates for a certain number of mickies. A similar software adjustment can provide for "acceleration" of the graphical pointer, i.e., moving the graphical pointer even more quickly, based on the length of time that the mouse is being moved along a given direction.

The body of a conventional mouse is usually sized to fit comfortably in an adult hand, which is often a problem, for example, if a child with a small hand is using it, or if an adult with a particularly large hand is using it. This problem can make using the device especially difficult for people with trauma disorders such as repetitive stress injuries (e.g., carpal tunnel syndrome), due to the repetitive nature of manipulation of the mouse in movement and button clicking. Gripping a mouse for extended periods of time is common in computer-related jobs and creates a high level of exertion and fatigue. The importance of proper hand and wrist support is discussed further in U.S. Pat. No. 5,340,067.

In addition to the size of the mouse, its shape also can vary. Early mice were basically rectangular, but recent mice include more curved and profiled designs to provide improved support. In addition to symmetric designs, asymmetric designs may be provided for left- and right-handed users. Each of these units are, however, independent, complete pointing devices which must be interchanged with any pointing device already connected to the computer system. For example, if a right-handed user wanted to switch out a left-handed mouse, the latter device would first have to be unplugged from the computer port and then a right-handed mouse plugged in. This swapping procedure can be troublesome if, for example, the computer system has a large housing or chassis with the mouse port in the back, which might be pushed up against a wall or otherwise not particularly accessible. Also, many computer systems have to be re-initialized (booted) when a different mouse is connected to the system, in order to properly register the mouse software driver. These difficulties make it practically impossible for a group of individuals, such as in a family, to use a wide variety of mice with different sizes or shapes. It would, therefore, be desirable to devise a method of providing a wide variety of mouse shapes and sizes without requiring swapping out the mice. It would be further advantageous if different mice designs could be provided in a low-cost manner.

SUMMARY OF THE INVENTION

It is therefore one object of the present invention to provide a hand-held pointer device for a computer system.

It is another object of the present invention to provide such a pointer device whose outer design can be modified easily and repeatably to suit the ornamental tastes or physical requirements of different users.

It is yet another object of the present invention to provide such a pointer device which allows modification of the outer design in a low-cost manner.

The foregoing objects are achieved in a hand-held mouse generally comprising a base pointing unit having a movement sensor and a plurality of switches for selecting a visual object indicated by a location of the graphical pointer on the display, means for transmitting signals generated by the movement sensor and the switches to the computer system, and an outer shell surrounding and removably attached to the base pointing unit, the outer shell having at least one button coupled to one of the switches. A user has to purchase only one base computer mouse in order to accommodate other users. The shells are easily switched since the users do not have to unplug the base computer mouse to switch to a different computer mouse. The shells are relatively inexpensive compared to purchasing completely separate computer mice. The outer shell completely covers a top portion of the base pointing unit. In order to provide stability, a plurality of contact points are formed along a periphery of a bottom surface of the outer shell. The outer shell can be removably attached to the base pointing unit by providing a friction fit between a groove on the base pointing unit and a rib on the outer shell. A release mechanism can be used to withdraw attachment points on the base computer mouse such that the shell can be lifted off the base mouse unit. The buttons on the outer shell can be physically engaged to the switches on the base pointing unit or electrically interconnected with the switches. Different shells can be used with a common base computer mouse for different computer systems, and the outer shell accordingly might have a fewer number of buttons than there are switches on the base pointing unit.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
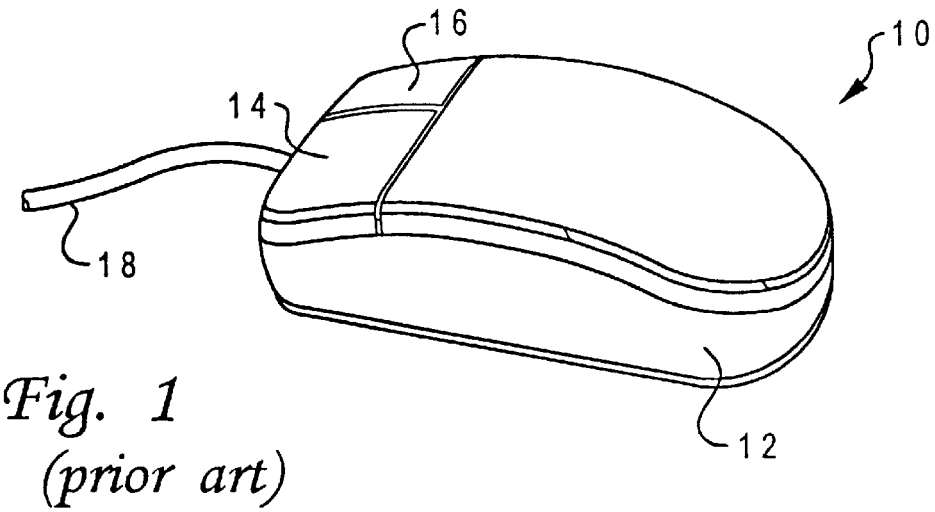
FIG. 1 is perspective view of a prior-art pointing device (mouse) used with a computer system.
Figure 2:
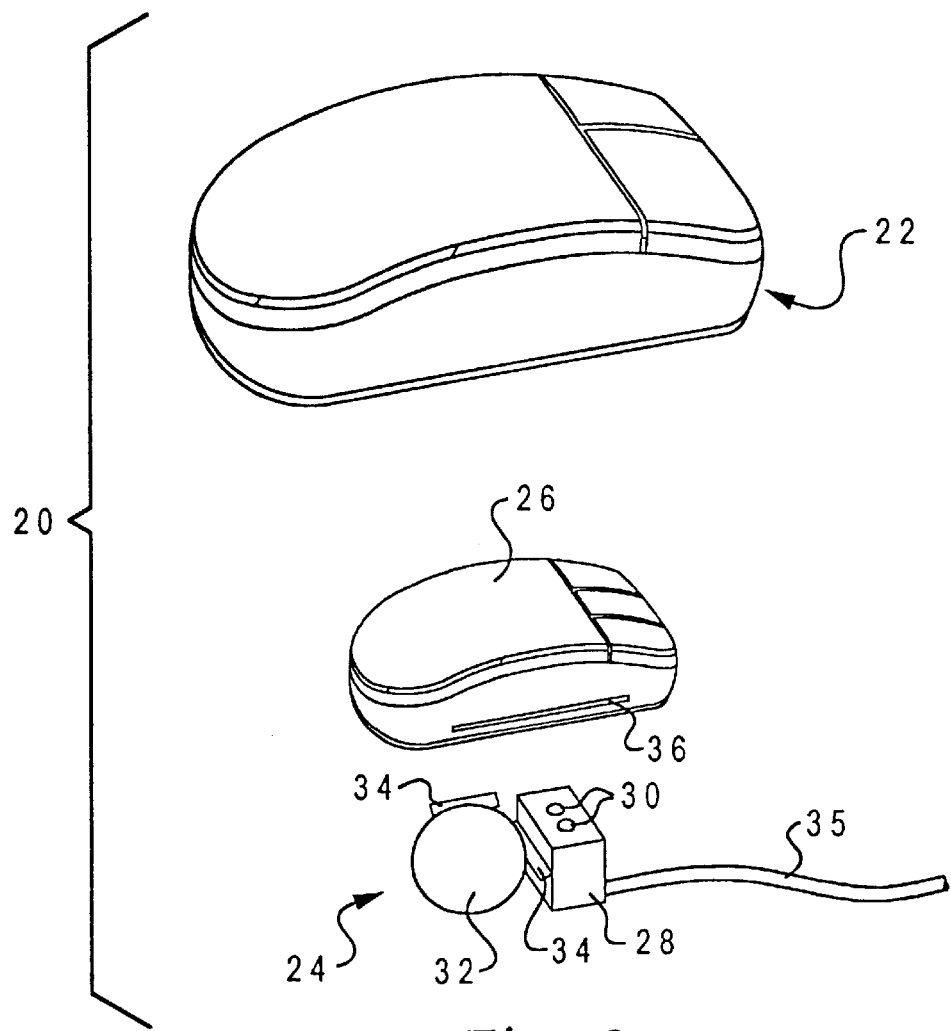
FIG. 2 is an exploded perspective view of one embodiment of a pointing device constructed in accordance with the present invention.

With reference now to the figures, and in particular with reference to FIG. 2, there is depicted one embodiment of a customized pointing device or mouse 20 constructed in accordance with the present invention. Customized mouse 20 is comprised generally of an outer mouse shell 22 and a base computer mouse 24. Base computer mouse 24 includes a base mouse body 26 and various components housed within body 26 which are required for basic mouse functionality. In the depicted embodiment, these additional components include an electronics package 28 having one or more electrical switches 30 which are activated when depressed, and a movement sensor including a roller ball 32 which is coupled to an electromechanical transducer that translates movement of ball 32 into electrical signals used by the computer system to control the movement of a graphical pointer on a visual display of the computer system. Ball 32 may be coupled to the transducer by, e.g., rollers 34. FIG. 2 also shows a wire 35 which may be used to carry the signals to the computer system, although other means could be provided, e.g., infrared or radio wave.

The smaller base computer mouse 24 contains all of the parts necessary to function as a computer mouse, and the size of base mouse body 26 is selected to conform to a size suitable for individuals having small hand sizes, without any additional adornment. Outer mouse shell 22 is then selected based on the particular needs or desires of the user. If the user has such a small hand size, and desires no ornamentation on the mouse, then base computer mouse 24 can be used without any shell. If, however, the user has a larger hand size, then the larger outer mouse shell 22 can be removably attached to base computer mouse 24 to provide more support to the user. A variety of outer mouse shell designs, having different functional or ornamental features, thus, can be provided in accordance with the needs or desires of the user.

Figure 3:
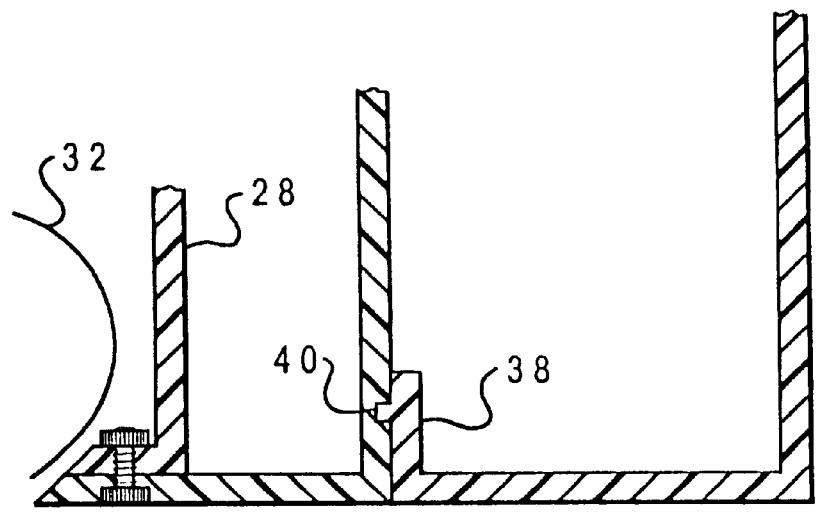
FIG. 3 is a sectional view of the pointing device of FIG. 2 showing how an outer mouse shell is removably attached to a base mouse body.

An outer mouse shell may be attached to base computer mouse 24 in any convenient manner. One method of attachment is shown in FIGS. 2 and 3. Base mouse body 26 has one or more grooves 36 formed in its outer surface. A flange 38 formed along the lower portion of shell 22 has a rib 40 which mates with groove 36 to provide a friction fit. This method of attachment provides a quick and simple way of applying the shell to the base computer mouse. Many other attachment means can be used, including snaps, hook-and-loop fasteners (Velcro), screws, etc. In more complicated designs, a release button could be used to, e.g., draw in attachment points which are part of the base computer mouse so that the shell could be lifted off of the base mouse unit.

Figure 4:
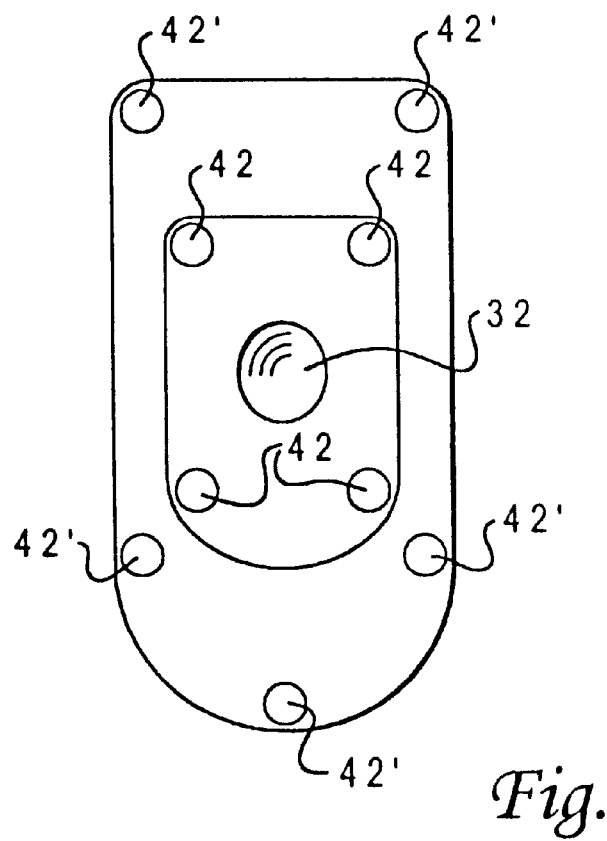
FIG. 4 is bottom plan view of the pointing device of FIG. 2.

With further reference to FIG. 4, which is a bottom plan view of the fully assembled, customized mouse 20, it can be seen that base computer mouse 24 has several contact points 42 along its bottom surface, to facilitate the sliding motion of the device across its support surface. The larger shell 22 includes a larger base area having additional contact points 42', which are spread out (along the periphery) to provide more stability during sliding movement of customized mouse 20, i.e., they reduce the tendency of the mouse to tip over (tilt) during movement. FIG. 4 also illustrates how only the bottom surface of base computer mouse 24 is visible or exposed in the fully assembled mouse, i.e., the top portion of base computer mouse 24 is completely surrounded by outer mouse shell 22.

Figure 5A:
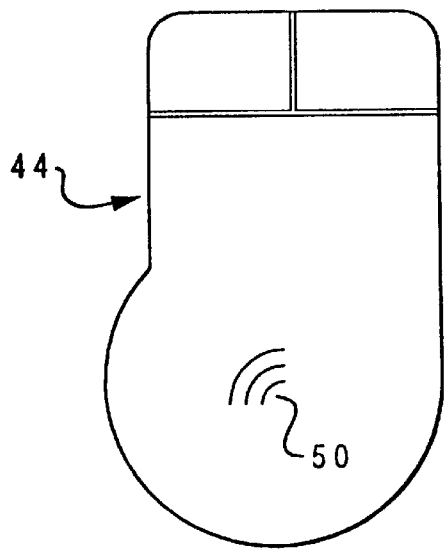
FIGS. 5A–5C are top plan views of different outer mouse shells that can be applied to a base mouse body in accordance with the present invention.
Figure 5B:
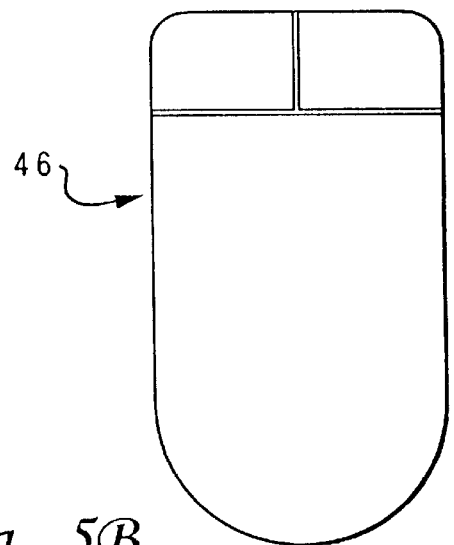
Figure 5C:
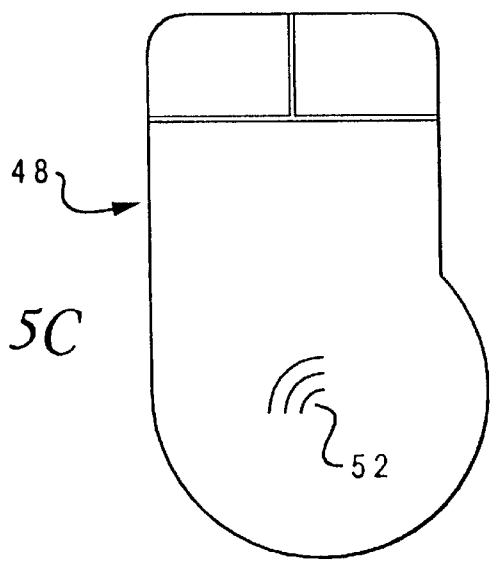

As noted above, different outer mouse shells may be provided for functional reasons or for purely ornamental reasons or for both. Ornamental features may include unusual shapes or figures formed into the shell or simply shells with different colors. Functional features may be related to hand size or to left/right handedness or to other physical requirements. For example, FIGS. 5A–5C show three different outer mouse shells 44, 46 and 48 which may be of various sizes. Shell 44 is adapted for a right-handed user and has a palm support 50 located appropriately; while shell 48 is adapted for a left-handed user and has an oppositely located palm support 52; and shell 46 is symmetric, i.e., adapted for use by either a left- or right-handed person. Provision of different mouse sizes or shapes accordingly allows the user to operate the mouse more efficiently and with less strain.

Figure 6:
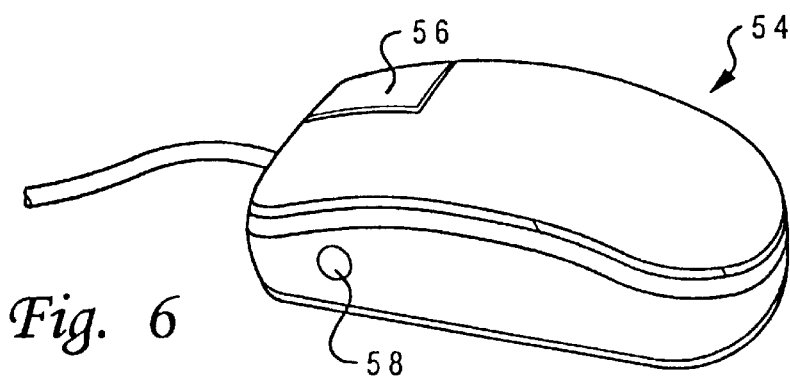
FIG. 6 is a perspective view of yet another outer mouse shell that can be applied to a base mouse body, the outer mouse shell having a different button construction.

In the foregoing embodiments, the outer mouse shell has a button configuration which is generally similar to the configuration of the buttons on the base computer mouse, i.e., two buttons arranged next to each other at the forward end of the shell. However, the ability to use removable shells further allows a user to have a custom button configuration. Someone with a manual disability could use a shell having buttons which are moved from the "default" locations shown in FIGS. 2 and 5A–5C. For example, a right-handed person missing the index and middle fingers of his right hand might use the customized mouse embodiment 54 of FIG. 6, which has a "regular" right button 56, but no regularly located left button. Instead of the default left button, a smaller button 58 is provided on the side of the shell, to be depressed by the user's thumb.

Regardless of the location of the buttons on the outer mouse shell, various means can be used to operatively engage the buttons of the shell with the buttons of the base computer mouse. In one construction, the inside surfaces of the buttons on the outer mouse shell can have extensions which physically push against the buttons of the base computer mouse. In a more complicated version of this construction (such as might be required for the embodiment of FIG. 6), levers or gears might be used to physically engage the buttons of the base computer mouse. Alternatively, an outer mouse shell can be provided with an electronics subassembly that has a plug which mates with a corresponding jack in the electronics package 28 in the base mouse unit to pass on button clicks, i.e., the buttons are electrically interconnected, not physically. The latter interconnection method is somewhat more costly.

Since outer mouse shells can have different button configurations with a single base mouse button configuration, this principle can be extended to provide different shells for different computer systems. For example, a common base unit with three different shells could be used to construct mice for an Apple computer system, an IBM PC computer system or an IBM RS/6000 computer system, even though these systems recognize different numbers of buttons.

Those skilled in the art will appreciate that the dimensions of a customized mouse made in accordance with the present invention may vary considerably. A base mouse unit might be as small as 4 cm×2 cm×2 cm, and a very large outer shell might be 20 cm×15 cm×8 cm. The outer mouse shell is preferably constructed of a durable, lightweight material, most preferably an injection-moldable polymer such as polycarbonate.

The foregoing approach has clear advantages over the prior art. A user has to purchase only one base computer mouse in order to accommodate various other users, such as members of the family. The shells are easily switched since the user does not have to unplug the base computer mouse to switch to a different computer mouse. The shells are relatively inexpensive compared to purchasing completely separate computer mice. Shells allow families to keep up with the growth of their children. With respect to primarily functional shells, utilizing an outer mouse shell which fits the hand as opposed to a standard-size computer mouse is ergonomically better. With respect to ornamental shells, users can indulge themselves inexpensively and use their mouse shells for fashion purposes, such as having different shells for different holidays.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. A hand-held device for transmitting signals used to control a graphical pointer on a display of a computer system, comprising:

a base pointing unit having a body, a movement sensor substantially located within said body and a plurality of switches on a surface of said body, for selecting a visual object indicated by a location of the graphical pointer on the display, said body further including a generally flat surface having an aperture which receives a portion of said movement sensor, wherein further, said plurality of switches is arranged in a first physical configuration;

said outer shell has a plurality of buttons respectively coupled to said switches, said buttons being arranged in a second physical configuration which is different from said first physical configuration;

means for transmitting signals generated by said movement sensor and said switches to the computer system, said transmitting means and base pointing unit collectively providing a complete graphical pointing device; and an outer shell surrounding and removably attached to said base pointing unit, said outer shell having at least one button coupled to one of said switches, and surrounding all of said base pointing unit body except said flat surface thereof.

2. The device of claim 1 wherein said outer shell completely covers a top portion of said base pointing unit.

3. The device of claim 1 wherein said outer shell has a fewer number of buttons than there are switches on said base pointing unit.

4. The device of claim 1 wherein said outer shell has a bottom surface, and a plurality of contact points are formed along a periphery of said bottom surface.

5. The device of claim 1 wherein said outer shell is removably attached to said base pointing unit by providing a friction fit between a groove on said base pointing unit and a rib on said outer shell.

6. The device of claim 1 further comprising a release mechanism for withdrawing attachment points on said base pointing unit such that said outer shell can be lifted off said base pointing unit.

7. The device of claim 1 wherein said outer shell has at least two buttons arranged adjacent one another at a forward end of said shell.

8. The device of claim 1 wherein said button physically engages said one switch.

9. The device of claim 1 said button is electrically interconnected with one of said switches.

10. A method of customizing a hand-held pointing device for transmitting signals used to control a graphical pointer on a display of a computer system, comprising the steps of:

providing a base pointing unit having a body, a movement sensor substantially located within said body and a plurality of switches on a surface of said body, for selecting a visual object indicated by a location of the graphical pointer on the display, said body further including a generally flat surface having an aperture which receives a portion of said movement sensor, and further having means for transmitting signals generated by the movement sensor and the switches to the computer system, said transmitting means and base pointing unit collectively providing a complete graphical pointing device, wherein further said plurality of switches is arranged in a first physical configuration;

said outer shell has a plurality of buttons respectively coupled to said switches, said buttons being arranged in a second physical configuration which is different from said first physical configuration; and removably attaching an outer shell to the base pointing unit such that the outer shell surrounds all of the base pointing unit body except said flat surface thereof, the outer shell having at least one button which is coupled to one of the switches.

11. The method of claim 1 further comprising the step of forming a plurality of contact points along a periphery of a bottom surface of the outer shell.

12. The method of claim 1 wherein said attaching step is accomplished by providing a friction fit between a groove on the base pointing unit and a rib on the outer shell.

13. The method of claim 1 further comprising the step of removing the outer shell from the base pointing unit using a release mechanism which withdraws attachment points on the base pointing unit such that the shell can be lifted off the base pointing unit.

* * * * *